United States Patent
Sawachi et al.

(10) Patent No.: US 11,513,541 B2
(45) Date of Patent: Nov. 29, 2022

(54) METHOD OF INSPECTING AND INSPECTION APPARATUS

(71) Applicant: Tokyo Electron Limited, Tokyo (JP)

(72) Inventors: Atsushi Sawachi, Miyagi (JP); Norihiko Amikura, Miyagi (JP)

(73) Assignee: Tokyo Electron Limited, Tokyo (JP)

( * ) Notice: Subject to any disclaimer, the term of this patent is extended or adjusted under 35 U.S.C. 154(b) by 633 days.

(21) Appl. No.: 16/656,935

(22) Filed: Oct. 18, 2019

(65) Prior Publication Data

US 2020/0124455 A1 Apr. 23, 2020

(30) Foreign Application Priority Data

Oct. 22, 2018 (JP) .............................. JP2018-198245

(51) Int. Cl.
*G05D 7/06* (2006.01)
*G01F 7/00* (2006.01)

(52) U.S. Cl.
CPC .......... *G05D 7/0635* (2013.01); *G01F 7/005* (2013.01)

(58) Field of Classification Search
CPC .. G05D 7/0635; G05D 7/0629; G05D 7/0623; G05D 7/0617
See application file for complete search history.

(56) References Cited

U.S. PATENT DOCUMENTS

2009/0248213 A1* 10/2009 Gotoh .................. G05D 7/0635
700/282

FOREIGN PATENT DOCUMENTS

| JP | H06-214657 A | 8/1994 |
| JP | H08-338546 A | 12/1996 |
| JP | 2004-199109 A | 7/2004 |
| JP | 2004-199245 A | 7/2004 |
| JP | 2013-088946 A | 5/2013 |
| JP | 2017-059200 A | 3/2017 |

* cited by examiner

*Primary Examiner* — Paul M. West
(74) *Attorney, Agent, or Firm* — Studebaker & Brackett PC

(57) ABSTRACT

The method for inspecting the flow rate controller for controlling a flow rate of a fluid includes creating and recording a three-dimensional database in which a first pressure, a set flow rate or a second pressure, and a control value of a piezoelectric element are associated with each other, based on reference data, measuring, as target data, control values of the piezoelectric element corresponding to the first pressure detected by a first pressure detector and the set flow rate specified in a recipe of a substrate processing process or the second pressure detected by a second pressure detector, at the time of the execution of the substrate processing process, and determining whether or not there is a problem in a diaphragm valve, by comparing the target data with the reference data included in the three-dimensional database.

5 Claims, 8 Drawing Sheets

METHOD OF INSPECTING AND INSPECTION APPARATUS

CROSS-REFERENCE TO RELATED APPLICATIONS

This application is based on and claims the benefit of priority from Japanese Patent Application No. 2018-198245 filed on Oct. 22, 2018, and the entire contents of which are incorporated herein by reference.

TECHNICAL FIELD

Exemplary embodiments of the present disclosure relate to a method of inspecting and an inspection apparatus.

BACKGROUND

Japanese Unexamined Patent Publication No. H8-338546 discloses a pressure-type flow rate control device for performing flow rate control. This device includes an orifice and a control valve provided upstream of the orifice. The control valve adjusts pressure upstream of the orifice and controls a flow rate downstream of the orifice so as to reach a set value. The control valve has a diaphragm, a piezoelectric element pressing the diaphragm downward, and a valve seat. The diaphragm is always pressed downward through the piezoelectric element and is in contact with the valve seat. If the pressing is released, the diaphragm returns upward with an elastic force. The diaphragm is separated from the valve seat, whereby the control valve enters an opened state.

SUMMARY

In an aspect of the present disclosure, a method is provided. The method is an inspection method of a flow rate controller for controlling a flow rate of a fluid, the flow rate controller including a first pressure detector configured to detect a first pressure that is a pressure of the fluid, a diaphragm valve provided downstream of the first pressure detector and having a diaphragm and a piezoelectric element for driving the diaphragm, a second pressure detector provided downstream of the diaphragm valve and configured to detect a second pressure that is a pressure of the fluid, and an orifice provided downstream of the second pressure detector, and the flow rate controller being connected to a processing apparatus for executing a substrate processing process, and controlling the diaphragm valve, based on the second pressure such that the flow rate of the fluid which is supplied to the processing apparatus becomes a set flow rate, the inspection method including: measuring, as reference data, control values of the piezoelectric element corresponding to the first pressure and the set flow rate or the second pressure while changing the first pressure and the set flow rate or the second pressure, before the execution of the substrate processing process; creating and recording a three-dimensional database in which the first pressure, the set flow rate or the second pressure, and the control value of the piezoelectric element are associated with each other, based on the reference data measured in the step of measuring the reference data; measuring, as target data, control values of the piezoelectric element corresponding to the first pressure detected by the first pressure detector and the set flow rate specified in a recipe of the substrate processing process or the second pressure detected by the second pressure detector, at the time of the execution of the substrate processing process; and determining whether or not there is a problem in the diaphragm valve, by comparing the target data with the reference data included in the three-dimensional database.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

DETAILED DESCRIPTION

Figure 1:
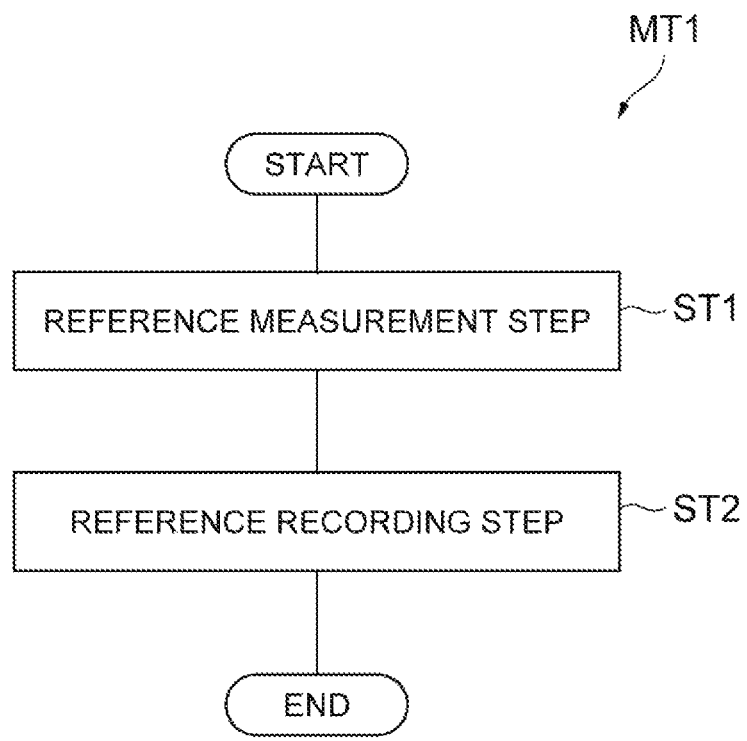
FIG. 1 is a flowchart illustrating an example of a reference acquisition step of an inspection method according to an embodiment.

Hereinafter, various exemplary embodiments will be described. In the following detailed description, reference is made to the accompanying drawings, which form a part hereof.

The exemplary embodiments described in the detailed description, drawing, and claims are not meant to be limiting. Other exemplary embodiments may be utilized, and other changes may be made, without departing from the spirit or scope of the subject matter presented here.

In a control valve of a flow rate controller, there is a concern that the flow rate of a fluid may deviate from a set value according to a use period, a use frequency, a use environment, or the like. For this reason, it is necessary to inspect whether or not the control valve can control the flow rate, based on the set value. However, the pressure-type flow rate control device described in Japanese Unexamined Patent Publication No. H8-338546 does not have a function capable of inspecting the control of the control valve. Further, in the control valve, a variation width of a piezoelectric element itself and a variation width of a diaphragm connected to the piezoelectric element are very small, and therefore, an individual difference in the displacement amount of the piezoelectric element itself and an individual difference in the displacement amount of the diaphragm occur. There is an individual difference between the flow rate controllers, and therefore, it is difficult to provide an inspection index applicable to all the flow rate controllers. Further, if the piezoelectric element can be inspected at the time of execution of a process, it is not necessary to stop an apparatus for the inspection, and therefore, the availability of the apparatus is improved.

The present disclosure provides a flow rate controller inspection method and an inspection apparatus, in which it is possible to inspect a flow rate control function regardless of an individual difference of the flow rate controller.

In an aspect of the present disclosure, an inspection method is provided. The inspection method is an inspection method for a flow rate controller for controlling a flow rate of a fluid, in which the flow rate controller includes a first pressure detector for detecting a first pressure that is a pressure of the fluid, a diaphragm valve provided downstream of the first pressure detector and having a diaphragm and a piezoelectric element for driving the diaphragm, a second pressure detector provided downstream of the diaphragm valve and detecting a second pressure that is a pressure of the fluid, and an orifice provided downstream of the second pressure detector, and the flow rate controller is connected to a processing apparatus for executing a substrate processing process and controls the diaphragm valve, based on the second pressure such that the flow rate of the fluid which is supplied to the processing apparatus becomes a set flow rate, the inspection method including: a reference measurement step of measuring, as reference data, control values of the piezoelectric element corresponding to the first pressure and the set flow rate or the second pressure while changing the first pressure and the set flow rate or the second pressure, before the execution of the substrate processing process; a reference recording step of creating and recording a three-dimensional database in which the first pressure, the set flow rate or the second pressure, and the control value of the piezoelectric element are associated with each other, based on the reference data measured in the reference measurement step; a target measurement step of measuring, as target data, control values of the piezoelectric element corresponding to the first pressure detected by the first pressure detector and the set flow rate specified in a recipe of the substrate processing process or the second pressure detected by the second pressure detector, at the time of the execution of the substrate processing process; and a determination step of determining whether or not there is a problem in the diaphragm valve, by comparing the target data with the reference data included in the three-dimensional database.

In the flow rate controller, the fluid flows through a flow path passing through the flow rate controller in the order of the first pressure detector, the diaphragm valve, the second pressure detector, and the orifice. In a case where the second pressure upstream of the orifice, which is detected by the second pressure detector, is two or more times the pressure downstream of the orifice, the flow rate of the fluid passing through the orifice is proportional to the second pressure. In this inspection method, in the reference measurement step, the first pressure and the set flow rate or the second pressure are changed before the execution of the substrate processing process, and the control values of the piezoelectric elements corresponding to the first pressure and the set flow rate or the second pressure are measured as the reference data. In the reference recording step, the three-dimensional database in which the first pressure, the set flow rate or the second pressure, and the control value of the piezoelectric element are associated with each other is created and recorded based on the reference data measured in the reference measurement step. In the target measurement step, the control values of the piezoelectric element corresponding to the detected first pressure and the set flow rate specified in the recipe or the detected second pressure are measured as the target data at the time of the execution of the substrate processing process. In the determination step, the reference data is compared with the target data. In this manner, before the execution of the substrate processing process, the control values of the piezoelectric element with respect to various combinations of the first pressure and the set flow rate or the second pressure are acquired in advance and compiled into a database. By using this three-dimensional database, it is possible to acquire a reference value of the control value of the piezoelectric element under any condition. For this reason, in the inspection method for the flow rate controller, it is possible to monitor the abnormality or secular change of the diaphragm valve even when the substrate processing process is executed. Accordingly, in this inspection method for the flow rate controller, it is possible to inspect the flow rate control function of the flow rate controller regardless of an individual difference of the flow rate controller.

In an embodiment, the reference acquisition step may use a first fluid as the fluid, the target measurement step may use a second fluid as the fluid, and the determination step may further include an application step of applying, to the reference data of the first fluid, a flow factor for converting into the reference data of the second fluid, and comparing the reference data of the second fluid with the target data of the second fluid.

There is a case where while the reference data in the first fluid is acquired in the reference acquisition step, the target data in the second fluid is measured in the target acquisition step. In this case, the determination step includes the application step, whereby it is possible to inspect the reference data of the second fluid and the target data of the second fluid by using the flow factor fort converting the reference data of the first fluid into the reference data of the second fluid. Accordingly, in this inspection method for the flow rate controller, even in a case of using a gaseous species different from the gaseous species of the reference data, it is possible to inspect the flow rate control function of the flow rate controller.

In an embodiment, the flow rate controller may further include a third pressure detector provided downstream of the orifice and detecting a third pressure that is pressure of the fluid. In this case, even in a case where the pressure upstream of the orifice is not two or more times the pressure downstream of the orifice, it is possible to calculate the flow rate of the fluid passing through the orifice.

In another aspect of the present disclosure, an inspection apparatus is provided. The inspection apparatus is an inspection apparatus for performing inspection related to control of a flow rate controller for controlling a flow rate of a fluid, in which the flow rate controller includes a first pressure detector for detecting a first pressure that is a pressure of the fluid, a diaphragm valve provided downstream of the first pressure detector and having a diaphragm and a piezoelectric element for driving the diaphragm, a second pressure detector provided downstream of the diaphragm valve and detecting a second pressure that is a pressure of the fluid, and an orifice provided downstream of the second pressure detector, and the flow rate controller is connected to a substrate processing apparatus for executing a substrate processing process and controls the diaphragm valve, based on the second pressure such that the flow rate of the fluid which is supplied to the substrate processing apparatus becomes a set flow rate, the inspection apparatus including an inspection part connected to the flow rate controller, the inspection part being configured to be capable of executing a reference measurement step of measuring, as reference data, control values of the piezoelectric element corresponding to the first pressure and the set flow rate or the second pressure while changing the first pressure and the set flow rate or the second pressure, before the execution of the substrate processing process, a reference recording step of creating and recording a three-dimensional database in which the first pressure, the set flow rate or the second pressure, and the control value of the piezoelectric element are associated with each other, based on the reference data measured in the reference measurement step, a target measurement step of measuring, as target data, control values of the piezoelectric element corresponding to the first pressure detected by the first pressure detector and the set flow rate specified in a recipe of the substrate processing process or the second pressure detected by the second pressure detector, at the time of the execution of the substrate processing process, and a determination step of determining whether or not there is a problem in the diaphragm valve, by comparing the target data with the reference data included in the three-dimensional database. According to this inspection apparatus, the same effects as those in the inspection method described above are exhibited.

Hereinafter, various embodiments will be described in detail with reference to the drawings. In the following description and each drawing, identical or equivalent elements are denoted by the same reference numerals, and overlapping description is not repeated. The dimensional ratios in the drawings do not necessarily coincide with those in the description. The terms "top", "bottom", "left", and "right" are based on the illustrated state and are for convenience.

Figure 2:
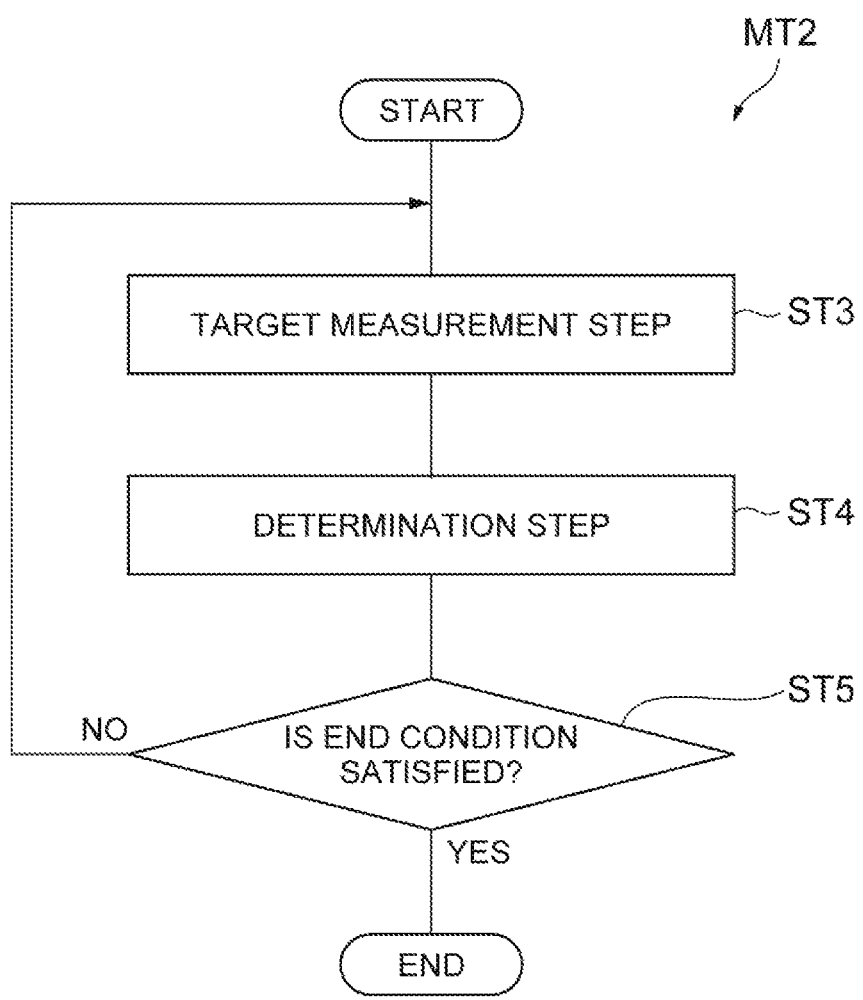
FIG. 2 is a flowchart illustrating an example of a target measurement step and a determination step of the inspection method according to the embodiment.

FIG. 1 is a flowchart illustrating an example of the reference acquisition step of the inspection method according to an embodiment. FIG. 2 is a flowchart illustrating an example of the target measurement step and the determination step of the inspection method according to the embodiment. An inspection method MT1 illustrated in FIG. 1 and an inspection method MT2 illustrated in FIG. 2 are methods of inspecting the flow rate control function of the flow rate controller. The inspection method MT1 and the inspection method MT2 are executed in order.

Figure 3:
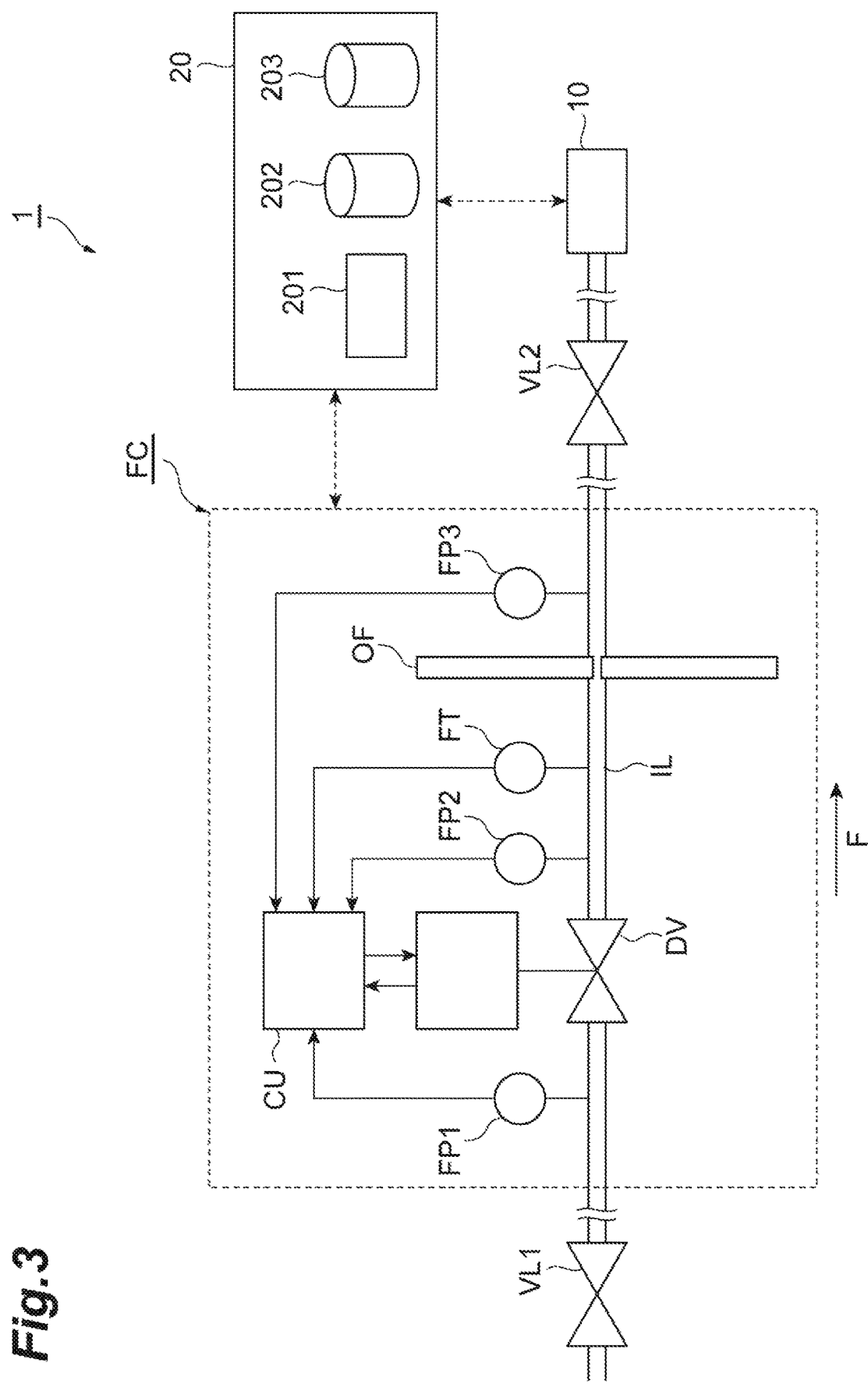
FIG. 3 is a schematic diagram illustrating an example of a processing system.

An example of a processing system including the flow rate controller to be inspected by the inspection methods MT1 and MT2 will be described. FIG. 3 is a schematic diagram illustrating an example of the processing system. A processing system 1 illustrated in FIG. 3 can include a processing apparatus 10 and a controller 20 (an example of the inspection apparatus). The processing apparatus 10 executes the substrate processing process in accordance with the instructions from the controller 20. The processing apparatus 10 processes a substrate by using a fluid, as an example of the substrate processing process. The fluid can be gas such as nitrogen gas or argon gas.

The processing apparatus 10 is connected to a supply source of the fluid by a flow path IL. The flow path IL is formed in a gas pipe made of, for example, stainless steel. The flow path IL allows the fluid to flow in the direction of an arrow F.

A first valve VL1, a flow rate controller FC, and a second valve VL2 are disposed in the flow path IL. The first valve VL1 is disposed upstream of the flow rate controller FC in the flow path IL. The second valve VL2 is disposed downstream of the flow rate controller FC in the flow path IL. The first valve VL1 and the second valve VL2 are opened or closed to permit or block the flow of the fluid to the downstream side.

The flow rate controller FC controls the flow rate of the fluid flowing through the flow path IL from the upstream side to the downstream side. The flow rate controller FC is connected to the processing apparatus 10 by the flow path IL. The flow rate controller FC controls the flow rate of the fluid which is supplied to the processing apparatus 10 so as to reach the set flow rate set by the controller 20.

The flow rate controller FC includes a first pressure detector FP1, a diaphragm valve DV, a second pressure detector FP2, and an orifice OF. The flow rate controller FC can include a third pressure detector FP3, a temperature detector FT, and a control unit CU. In the flow rate controller FC, the first pressure detector FP1, the diaphragm valve DV, the second pressure detector FP2, the temperature detector FT, the orifice OF, and the third pressure detector FP3 are provided in the flow path IL in order from the upstream side to the downstream side.

The first pressure detector FP1 detects a first pressure P1, which is the pressure of the fluid in the flow path IL, upstream of the diaphragm valve DV. The second pressure detector FP2 detects a second pressure P2, which is the pressure of the fluid in the flow path IL, between the diaphragm valve DV and the orifice OF. The third pressure detector detects a third pressure P3, which is the pressure of the fluid in the flow path IL, downstream of the orifice OF. The first pressure detector FP1, the second pressure detector FP2, and the third pressure detector FP3 are, for example, pressure transducers. Each of the first pressure detector FP1, the second pressure detector FP2, and the third pressure detector FP3 outputs information on the detected pressure value to the control unit CU.

Figure 4:
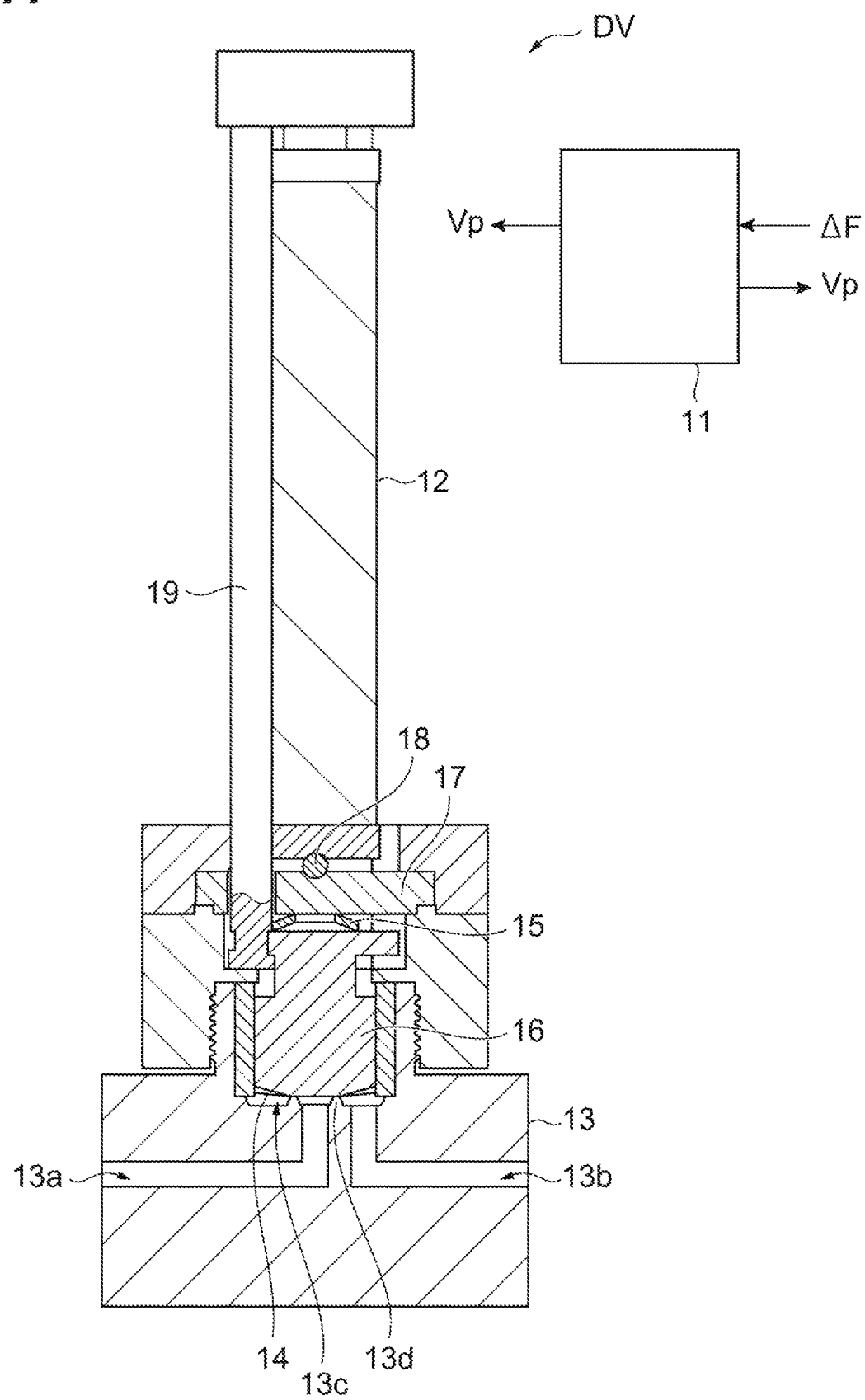
FIG. 4 is a diagram illustrating an example of a configuration of a diaphragm valve.

The diaphragm valve DV is provided downstream of the first pressure detector FP1. As a more specific example, the diaphragm valve DV is provided on the flow path IL between the first pressure detector FP1 and the second pressure detector FP2. FIG. 4 is a diagram illustrating an example of the configuration of the diaphragm valve. The diaphragm valve DV includes a diaphragm 14 and a piezoelectric element 12 (a piezo element) for driving the diaphragm 14. The diaphragm 14 opens and closes the flow path IL by the operation of the piezoelectric element 12. An example of the diaphragm valve DV illustrated in FIG. 4 includes a control circuit 11, a main body 13, a disk spring 15, a hold-down member 16, a base member 17, a spherical body 18, and a support member 19.

The piezoelectric element 12 drives the diaphragm 14 as an opening and closing operation of the diaphragm valve DV. The piezoelectric element 12 extends in response to an applied voltage Vp controlled by the control circuit 11 and performs the opening and closing of the diaphragm valve DV by causing the diaphragm 14 to come close to or be separated from a valve seat 13d (described later).

The main body 13 has a flow path 13a, a flow path 13b, a valve chamber 13e, and the valve seat 13d. The flow path 13a and the flow path 13b configure a part of the flow path IL described above. The diaphragm 14 is biased to the valve seat 13d by the disk spring 15 through the hold-down member 16. In a case where the applied voltage Vp to the piezoelectric element 12 is zero, the diaphragm 14 is in contact with the valve seat 13d and the diaphragm valve DV is in a closed state.

One end (in the drawing, a lower end) of the piezoelectric element 12 is supported by the base member 17. The piezoelectric element 12 is connected to the support member 19. The support member 19 is coupled to the hold-down member 16 at one end (in the drawing, a lower end) thereof. If the applied voltage Vp is applied to the piezoelectric element 12, the piezoelectric element 12 extends. If the piezoelectric element 12 extends, the support member 19 moves in the direction away from the valve seat 13d, and accordingly, the hold-down member 16 also moves in the direction away from the valve seat 13d. In this way, the diaphragm 14 is separated from the valve seat 13d, so that the diaphragm valve DV enters an opened state. The degree of opening of the diaphragm valve DV, that is, the distance between the diaphragm 14 and the valve seat 13d is controlled by the applied voltage Vp which is applied to the piezoelectric element 12.

A flow rate difference ΔF between an output flow rate and a set flow rate is input from the control unit CU to the control circuit 11. The output flow rate is a flow rate downstream of the orifice OF. The set flow rate is a target value of the output flow rate set in advance. The set flow rate can be set by the controller 20. The control circuit 11 controls the applied voltage Vp which is applied to the piezoelectric element 12 such that the flow rate difference ΔF becomes zero, for example. The control circuit 11 inputs a signal specifying the applied voltage Vp to the piezoelectric element 12 to the control unit CU. That is, the control unit CU can acquire a signal specifying the applied voltage Vp to the piezoelectric element 12 (a control value of the piezoelectric element 12).

FIG. 3 is referred to again. The orifice OF partially reduces the cross-sectional area of the flow path IL in the flow path IL between the second pressure detector FP2 and the third pressure detector FP3. The temperature detector FT detects the temperature of the fluid in the flow path IL between the diaphragm valve DV and the orifice OF. The temperature detector FT outputs information on the detected temperature to the control unit CU.

The control unit CU can be configured with a control device (a control board) composed of a microcomputer provided with a CPU. The hardware of the control unit CU can be configured with a circuit (control) board equipped with a central processing unit (CPU), a read only memory (ROM), a random access memory (RAM), an A/D conversion circuit, a D/A conversion circuit, and a communication I/F (interface) circuit. The control unit CU is communicably connected to the first pressure detector FP1, the second pressure detector FP2, the third pressure detector FP3, the temperature detector FT, and the diaphragm valve DV.

The control unit CU calculates the output flow rate, based on the second pressure P2 detected by the second pressure detector FP2. In a case where the second pressure P2 upstream of the orifice OF is two or more times the third pressure downstream of the orifice OF, the flow rate of the fluid passing through the orifice OF is proportional to the second pressure P2. For this reason, the flow rate controller FC is operated under the condition that the second pressure P2 becomes two or more times the third pressure P3 downstream of the orifice OF, whereby the output flow rate of the flow rate controller FC is determined based on the second pressure P2. The flow rate controller FC may not include the third pressure detector FP3 in a case of being used in a state where the second pressure P2 is two or more times the third pressure P3.

The control unit CU may correct the output flow rate, based on the temperature detected by the temperature detector FT. In this case, the control unit CU can more accurately calculate the output flow rate.

The control unit CU may calculate the output flow rate by further using the third pressure P3 detected by the third pressure detector FP3. In a case where the second pressure P2 upstream of the orifice OF is not two or more times the third pressure P3 downstream of the orifice OF, the flow rate of the fluid passing through the orifice OF can be derived from the differential pressure between the second pressure P2 and the third pressure P3.

The control unit CU obtains the flow rate difference ΔF by calculating the difference between the output flow rate calculated as described above and the set flow rate acquired from the controller 20. The control unit CU outputs the obtained flow rate difference ΔF to the control circuit 11.

The controller 20 can be configured with a control device (a control board) composed of a microcomputer provided with a CPU. The hardware of the controller 20 can be configured with a circuit (control) board equipped with a CPU, a ROM, a RAM, an A/D conversion circuit, a D/A conversion circuit, and a communication I/F circuit.

The controller 20 is communicably connected to the control unit CU and the processing apparatus 10. The controller 20 outputs the instructions to the processing apparatus 10 to cause the processing apparatus 10 to execute the substrate processing process. The controller 20 outputs the set flow rate to the control unit CU of the flow rate controller FC to cause the fluid to flow through the flow rate controller FC at the set flow rate.

The controller 20 includes the inspection part 201, a recipe recording part 202, and a database recording part 203. A recipe of the substrate processing process is stored in the recipe recording part 202. The recipe can include a time of a processing step, a gaseous species, the set flow rate, and the like. The inspection part 201 refers to the recipe to output the set flow rate to the control unit CU of the flow rate controller FC.

Figure 5:
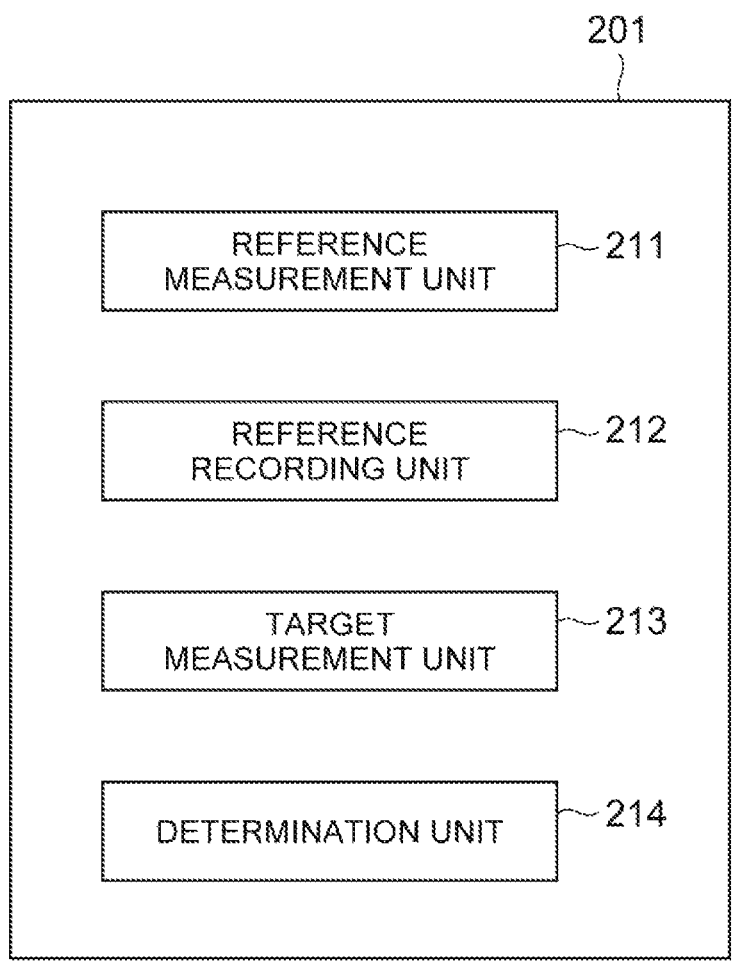
FIG. 5 is a block diagram illustrating an example of a function of a controller.

FIG. 5 is a block diagram illustrating an example of the function of the controller. The inspection part 201 of the controller 20 can include a reference measurement unit 211, a reference recording unit 212, a target measurement unit 213, and a determination unit 214.

The reference measurement unit 211 is configured to be capable of executing the reference measurement step (ST1) in the inspection method MT1. The reference recording unit 212 is configured to be capable of executing the reference recording step (ST2) in the inspection method MT1. The target measurement unit 213 is configured to be capable of executing the target measurement step (ST3) in the inspection method MT2. The determination unit 214 is configured to be capable of executing the determination step (ST4) in the inspection method MT2.

(Inspection Method for Flow Rate Controller)

Hereinafter, the inspection method MT1 will be described with reference to FIG. 1 again. The inspection method MT1 is executed in advance by the controller 20 before the execution of the substrate processing process.

The reference measurement unit 211 of the controller 20 measures, as the reference data, the applied voltages Vp corresponding to the first pressure P1 and the set flow rate or the second pressure P2 while changing the first pressure P1 and the set flow rate or the second pressure P2, as the reference measurement step (ST1). The reference measurement unit 211 prepares any combination of the first pressure P1 and the set flow rate and acquires the applied voltage Vp corresponding to the combination. Alternatively, the reference measurement unit 211 may prepare any combination of the first pressure P1 and the second pressure P2 and acquire the applied voltage Vp corresponding to the combination.

Figure 6:
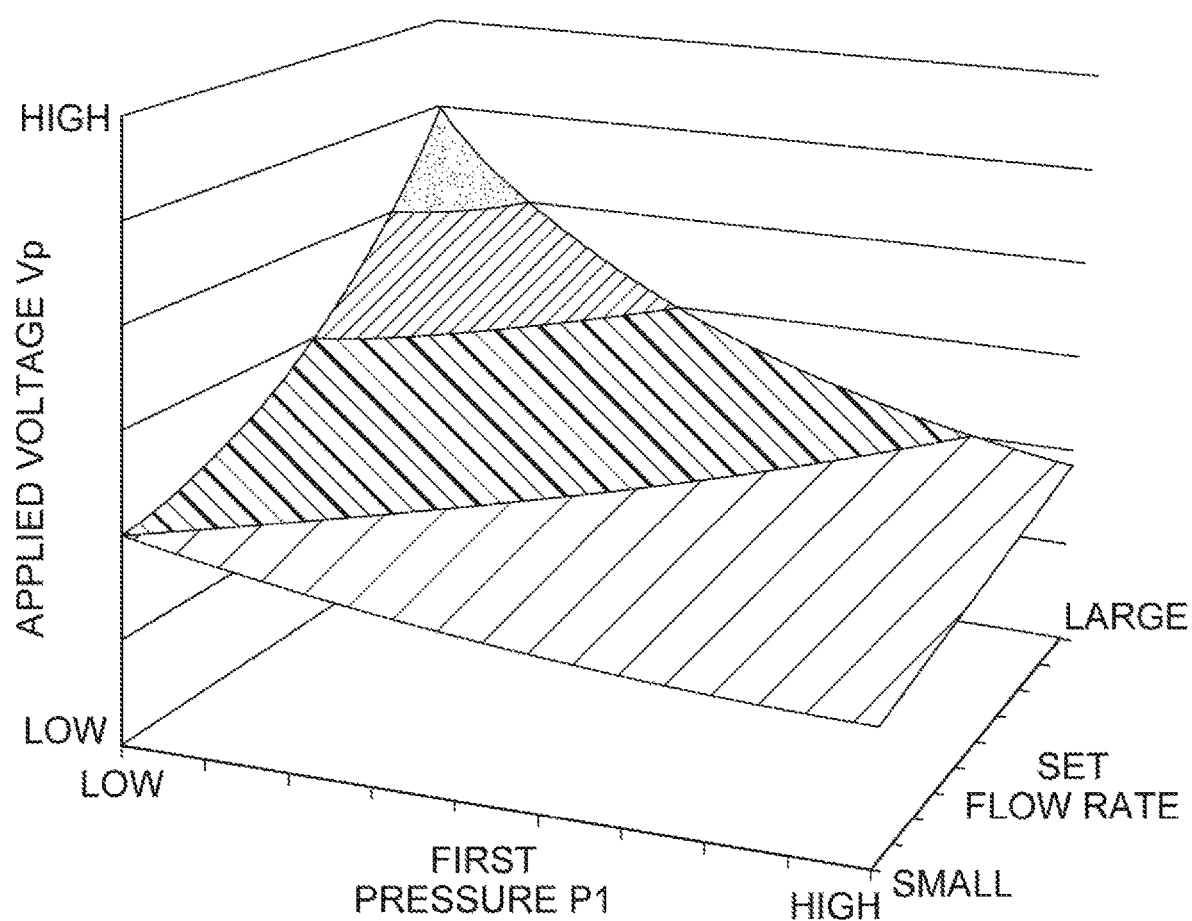
FIG. 6 is an example in which the contents of a three-dimensional database are visualized.

The reference recording unit 212 of the controller 20 creates and records the three-dimensional database in which the first pressure P1, the set flow rate or the second pressure P2, and the applied voltage Vp are associated with each other, based on the reference data measured in the reference measurement step (ST1), as the reference recording step (ST2). The three-dimensional database is a database in which the first pressure P1, the set flow rate or the second pressure P2, and the applied voltage Vp are associated with each other. The reference recording unit 212 creates the three-dimensional database by plotting the reference data in three dimensions with the first pressure P1, the set flow rate, and the applied voltage Vp as axes, as an example. FIG. 6 is an example in which the contents of the three-dimensional database are visualized. As illustrated in FIG. 6, the relationship between the first pressure P1, the set flow rate, and the applied voltage Vp can be visually displayed. The reference recording unit 212 stores the created three-dimensional database in the database recording part 203. The set flow rate in FIG. 6 may be the second pressure P2. In a case where the three-dimensional database is recorded in the reference recording step (ST2), the controller 20 ends the inspection method MT1.

Hereinafter, the inspection method MT2 will be described with reference to FIG. 2 again. The inspection method MT2 is executed by the controller 20 when the substrate processing process is executed.

The target measurement unit 213 of the controller 20 measures the applied voltage Vp as the target data at the time of the execution of the substrate processing process, as the target measurement step (ST3). First, the target measurement unit 213 acquires the first pressure P1 and the set flow rate or the second pressure P2 at the time of the measurement of the applied voltage Vp. The target measurement unit 213 acquires the first pressure P1 from the first pressure detector FP1. The target measurement unit 213 refers to the recipe recording part 202 to acquire the set flow rate specified in the recipe. Alternatively, the target measurement unit 213 acquires the second pressure P2 from the second pressure detector FP2. Then, the target measurement unit 213 measures the applied voltage Vp and associates it with the combination of the first pressure P1 and the set flow rate or the second pressure P2 at the time of the measurement.

Figure 7:
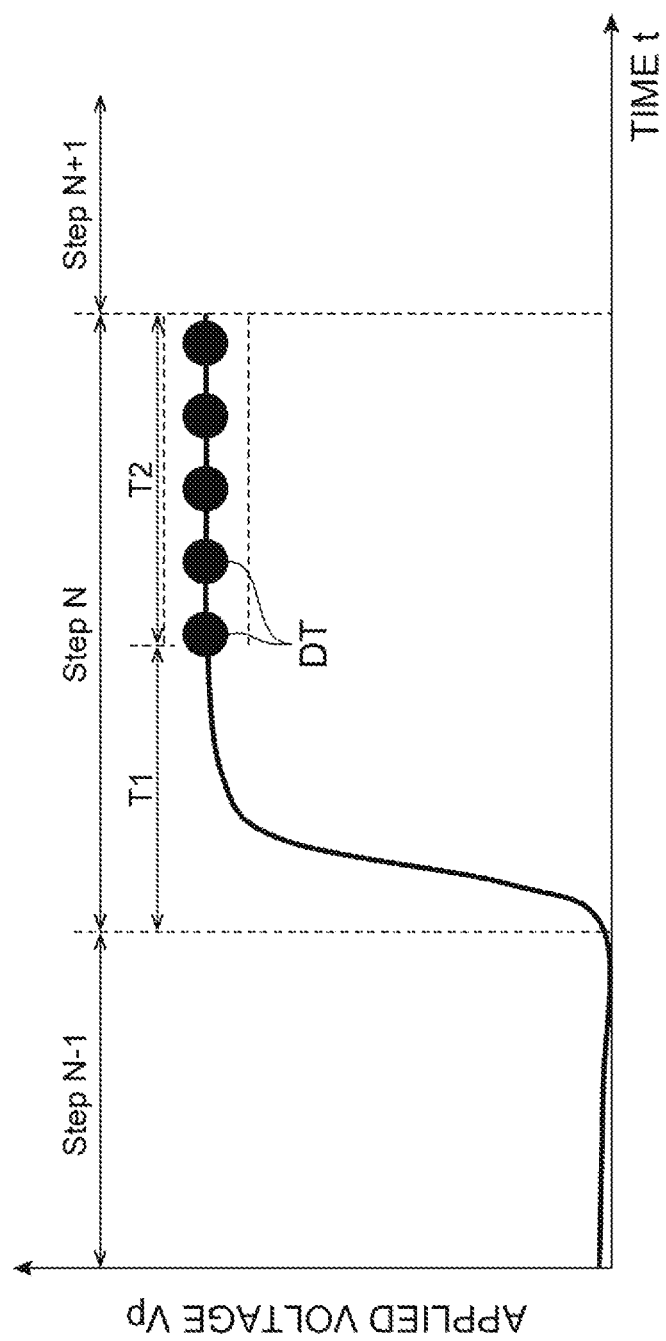
FIG. 7 is an example of a change over time of an applied voltage.

FIG. 7 is an example of a change over time of the applied voltage. In FIG. 7, the applied voltage Vp is applied in a processing step N (Step N). The target measurement unit 213 starts the measurement of the applied voltage Vp after a first period T1 that is a predetermined period has elapsed since the start of the processing step N. The target measurement unit 213 may acquire a plurality of data DT of the applied voltage Vp. In this case, the target measurement unit 213 may average the plurality of data DT in an acquisition period T2.

The determination unit 214 of the controller 20 compares the target data with the reference data included in the three-dimensional database, as the determination step (ST4). The determination unit 214 acquires the applied voltage Vp, which is the reference data, based on the first pressure P1 and the set flow rate or the second pressure P2 at the time of the measurement and the three-dimensional database illustrated in FIG. 6, as an example. The determination unit 214 determines whether or not there is a problem in the diaphragm valve DV, by comparing the applied voltage Vp, which is the reference data, with the applied voltage Vp measured at the time of the execution of the substrate processing process. As an example, if the difference between the applied voltage Vp, which is the reference data, and the measured applied voltage Vp is equal to or greater than a reference value, the determination unit 214 determines that there is a problem in the diaphragm valve DV. As an example, if the difference between the applied voltage Vp, which is the reference data, and the measured applied voltage Vp is smaller than the reference value, the determination unit 214 determines that there is no problem in the diaphragm valve DV. The reference value can be determined in consideration of variation in communication, variation in reproducibility of the piezoelectric element 12 itself, or the like. The determination unit 214 may record the determination result on a recording device, or may display the determination result on a monitor device or the like.

The controller 20 determines whether or not an inspection status satisfies an end condition, as an inspection end determination (ST5). For example, in a case where the inspection is carried out in a plurality of steps of the substrate processing process, the end condition is satisfied when all the inspections are ended in a target step. In a case where the end condition is satisfied, the controller 20 ends the inspection method MT2. The determination step (ST4) may be started after all the target data are measured in the target measurement step (ST3). In that case, the end determination step (ST5) may not be provided.

(Application of Flow Factor)

In a case where the fluid of the reference data measured in the reference measurement step (ST1) is a first fluid and the fluid of the target data measured in the target measurement step (ST3) is a second fluid, the determination step (ST4) can have an application step. The first fluid and the second fluid are different types of fluids. The application step is performed before the comparison of the reference data with the target data. In the application step, the flow factor for converting the reference data of the first fluid into the reference data of the second fluid is applied by the determination unit 214. The flow factor can be a numerical value representing a change in flow rate display according to the type of the second fluid with respect to the first fluid. The flow factor includes characteristic values such as density, a specific heat ratio, and a gas constant corresponding to the first fluid and the second fluid. As an example, the flow factor may be a coefficient which is defined by the international standard IEC60534-1 (corresponding to Japanese Industrial Standard JIS B 2005-1). The flow factor may be a value determined such that the flow rate of an orifice in which the flow rate of water at 60° F. flows at 1 gallon/min in one minute with a pressure difference of 1 psi becomes 1. In a case of adopting gas, the definition may be made by replacing water with air.

Figure 8:
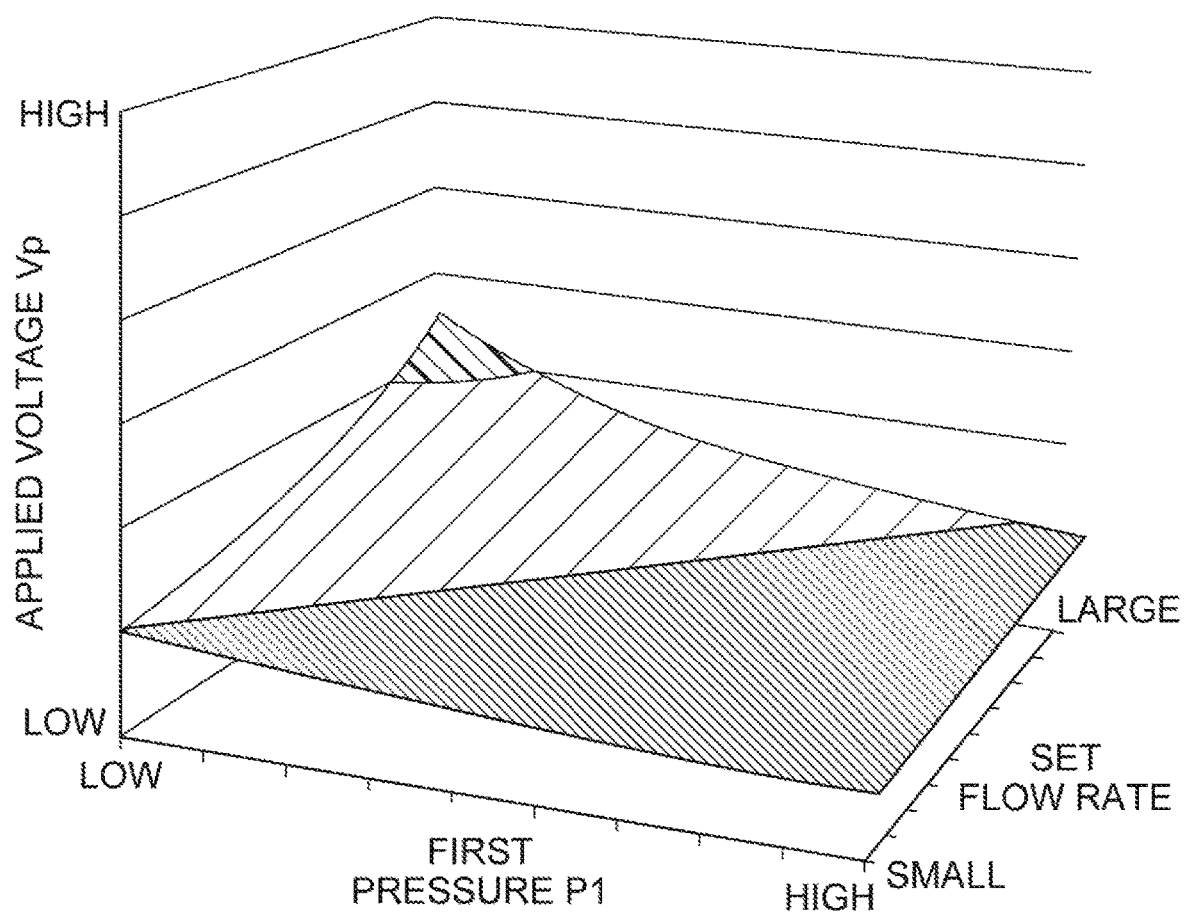
FIG. 8 is an example in which the contents of a converted three-dimensional database are visualized.

By the application of the flow factor in the application step, it is possible to convert the first pressure P1, the set flow rate or the second pressure P2 of the first fluid, and the applied voltage Vp into the first pressure P1, the set flow rate or the second pressure P2 of the second fluid, and the applied voltage Vp. FIG. 8 is an example in which the contents of the converted three-dimensional database are visualized. The three-dimensional database illustrated in FIG. 8 is the database obtained by applying the flow factor to the three-dimensional database illustrated in FIG. 6. In this manner, it is possible to acquire the three-dimensional database of the second fluid, based on the three-dimensional database of the first fluid. The determination unit 214 compares the target data with the reference data included in the three-dimensional database, after the application step.

As described above, according to the inspection methods MT1 and MT2, in the reference measurement step (ST1), the first pressure P1 and the set flow rate or the second pressure P2 are changed before the execution of the substrate processing process, and the applied voltages Vp corresponding thereto are measured as the reference data. In the reference recording step (ST2), the three-dimensional database in which the first pressure P1, the set flow rate or the second pressure P2, and the applied voltage Vp are associated with each other is created and recorded based on the reference data measured in the reference measurement step (ST1). In the target measurement step (ST3), at the time of the execution of the substrate processing process, the applied voltages Vp corresponding to the detected first pressure P1 and the set flow rate specified in the recipe or the detected second pressure P2 are measured as the target data. In the determination step (ST4), the reference data is compared with the target data. In this manner, before the execution of the substrate processing process, the applied voltages Vp with respect to various combinations of the first pressure P1 and the set flow rate or the second pressure P2 are acquired in advance and complied into a database. By using this three-dimensional database, it is possible to acquire the reference value of the applied voltage Vp under any condition. For this reason, the inspection methods MT1 and MT2 can monitor the abnormality or specular change of the diaphragm valve even at the time of the execution of the substrate processing process. Accordingly, the inspection methods MT1 and MT2 can inspect the flow rate control function of the flow rate controller FC regardless of the individual difference of the flow rate controller FC.

The inspection methods MT1 and MT2 can inspect the flow rate control function of the flow rate controller FC by using the flow factor, even in a case of using a gaseous species different from the gaseous species of the reference data.

Although various exemplary embodiments have been described above, the present disclosure is not limited to the exemplary embodiments described above, and various omissions, substitutions, and changes may be made. Further, it is possible to combine the elements in different embodiments to form other embodiments. For example, the function of the inspection part 201 may be provided in the control unit CU.

From the above description, it will be understood that various embodiments of the present disclosure have been described in this specification for purposes of description and that various modifications can be made without departing from the scope and gist of the present disclosure. Therefore, various embodiments disclosed in this specification are not intended to limit the present disclosure, and the true scope and gist are shown by the appended claims.

What is claimed is:

1. A method of inspecting a flow rate controller for controlling a flow rate of a fluid,
the flow rate controller including
a first pressure detector configured to detect a first pressure that is a pressure of the fluid,
a diaphragm valve provided downstream of the first pressure detector and having a diaphragm and a piezoelectric element for driving the diaphragm,
a second pressure detector provided downstream of the diaphragm valve and configured to detect a second pressure that is a pressure of the fluid, and
an orifice provided downstream of the second pressure detector, and
the flow rate controller being connected to a processing apparatus for executing a substrate processing process, and controlling the diaphragm valve, based on the second pressure such that the flow rate of the fluid which is supplied to the processing apparatus becomes a set flow rate,
the method comprising:
measuring, as reference data, control values of the piezoelectric element corresponding to the first pressure and the set flow rate or the second pressure while changing the first pressure and the set flow rate or the second pressure, before the execution of the substrate processing process;
creating and recording a three-dimensional database in which the first pressure, the set flow rate or the second pressure, and the control value of the piezoelectric element are associated with each other, based on the reference data measured in the measuring the reference data;
measuring, as target data, control values of the piezoelectric element corresponding to the first pressure detected by the first pressure detector and the set flow rate specified in a recipe of the substrate processing process or the second pressure detected by the second pressure detector, at the time of the execution of the substrate processing process; and
determining whether or not there is a problem in the diaphragm valve, by comparing the target data with the reference data included in the three-dimensional database.

2. The method according to claim 1, wherein the measuring the reference data uses a first fluid as the fluid,
the measuring the target data uses a second fluid as the fluid, and
the determining further includes applying, to the reference data of the first fluid, a flow factor for converting into the reference data of the second fluid, and comparing the reference data of the second fluid with the target data of the second fluid.

3. The method according to claim 1, wherein the flow rate controller further includes a third pressure detector provided downstream of the orifice and configured to detect a third pressure that is a pressure of the fluid.

4. The method according to claim 2, wherein the flow rate controller further includes a third pressure detector provided downstream of the orifice and configured to detect a third pressure that is a pressure of the fluid.

5. An inspection apparatus for performing inspection related to control of a flow rate controller for controlling a flow rate of a fluid,
the flow rate controller including
a first pressure detector configured to detect a first pressure that is a pressure of the fluid,
a diaphragm valve provided downstream of the first pressure detector and having a diaphragm and a piezoelectric element for driving the diaphragm,
a second pressure detector provided downstream of the diaphragm valve and configured to detect a second pressure that is a pressure of the fluid, and
an orifice provided downstream of the second pressure detector, and
the flow rate controller being connected to a processing apparatus for executing a substrate processing process, and controlling the diaphragm valve, based on the second pressure such that the flow rate of the fluid which is supplied to the processing apparatus becomes a set flow rate,
the inspection apparatus comprising an inspection part connected to the flow rate controller,
the inspection part being configured to execute:
measuring, as reference data, control values of the piezoelectric element corresponding to the first pressure and the set flow rate or the second pressure while changing the first pressure and the set flow rate or the second pressure, before execution of the substrate processing process;
creating and recording a three-dimensional database in which the first pressure, the set flow rate or the second pressure, and the control value of the piezoelectric element are associated with each other, based on the reference data measured in the measuring the reference data;

measuring, as target data, control values of the piezoelectric element corresponding to the first pressure detected by the first pressure detector and the set flow rate specified in a recipe of the substrate processing process or the second pressure detected by the second pressure detector, at the time of the execution of the substrate processing process; and determining whether or not there is a problem in the diaphragm valve, by comparing the target data with the reference data included in the three-dimensional database.

* * * * *